(12) United States Patent
Somarakis et al.

(10) Patent No.: US 7,222,725 B1
(45) Date of Patent: May 29, 2007

(54) PIN CONVEYOR FOR PASTY MATERIALS SUCH AS ANIMAL WASTE

(75) Inventors: John Somarakis, Vancouver, WA (US); Peter C. Wilson, Washougal, WA (US)

(73) Assignee: Somarakis Environmental Systems, LLC, Vancouver, WA (US)

( * ) Notice: Subject to any disclaimer, the term of this patent is extended or adjusted under 35 U.S.C. 154(b) by 0 days.

(21) Appl. No.: 11/450,255

(22) Filed: Jun. 12, 2006

(51) Int. Cl.
*B65G 33/00* (2006.01)
*B65G 33/08* (2006.01)

(52) U.S. Cl. .................. 198/676; 366/313; 366/325.3; 366/327.2

(58) Field of Classification Search ................ 198/676; 366/152.2, 325.2, 325.3, 327.2, 312, 313; 425/222
See application file for complete search history.

(56) References Cited

U.S. PATENT DOCUMENTS

| | | | | |
|---|---|---|---|---|
| 1,106,736 A | * | 8/1914 | Schuler | 198/676 |
| 1,247,153 A | | 11/1917 | Roberts | |
| 2,592,481 A | * | 4/1952 | Sixt et al. | 241/102 |
| 3,145,017 A | | 8/1964 | Thomas | |
| 3,326,642 A | * | 6/1967 | Ruble | 23/314 |
| 3,353,208 A | | 11/1967 | Fergus | |
| 3,601,371 A | * | 8/1971 | Ross | 366/325.2 |
| 3,697,056 A | | 10/1972 | Prins, Sr. et al. | |
| 3,752,057 A | | 8/1973 | Groen, Jr. | |
| 3,807,702 A | | 4/1974 | Grillo et al. | |
| 3,825,233 A | * | 7/1974 | Henderson | 366/325.2 |
| 3,848,289 A | | 11/1974 | Bachmann | |
| 4,136,975 A | | 1/1979 | Forseth | |
| 4,159,181 A | * | 6/1979 | Perrine | 366/172.1 |
| 4,171,165 A | * | 10/1979 | Card | 366/186 |
| 4,502,858 A | | 3/1985 | Kertok | |
| 4,606,647 A | | 8/1986 | Frye | |
| 4,818,116 A | | 4/1989 | Pardo et al. | |
| 4,881,887 A | | 11/1989 | Holley | |
| 4,931,610 A | | 6/1990 | Hughes et al. | |
| 5,022,840 A | | 6/1991 | Holley | |
| 5,547,277 A | | 8/1996 | Caspelherr et al. | |
| 5,890,804 A | | 4/1999 | Edwards et al. | |
| 6,843,922 B1 | | 1/2005 | Summers, Jr. et al. | |

OTHER PUBLICATIONS

Thin-film & Wiped-film Evaporator Repair & Field Service, LCI Corporation, Charlotte, NC 2005.

* cited by examiner

*Primary Examiner*—Mark A. Deuble
(74) *Attorney, Agent, or Firm*—W. Scott Carson

(57) ABSTRACT

A pin conveyor for pasty materials such as animal waste including a housing with a cylindrical inner surface extending along and about an axis. Within the housing surface, a shaft is mounted for rotation about the axis and has a plurality of pins attached to it in a substantially helical pattern. The pins have sleeve members slidably mounted about them wherein in operation, the sleeve members are centrifugally impelled outwardly of the pins to contact and scrape clean the housing surface as the shaft is rotated about the axis. The cylindrical outer surfaces of the sleeve members preferably overlap or are at least tangent to one another when viewed in a plane perpendicular to the rotational axis so as to effectively contact and scrape clean the entire housing surface surrounding them.

22 Claims, 4 Drawing Sheets

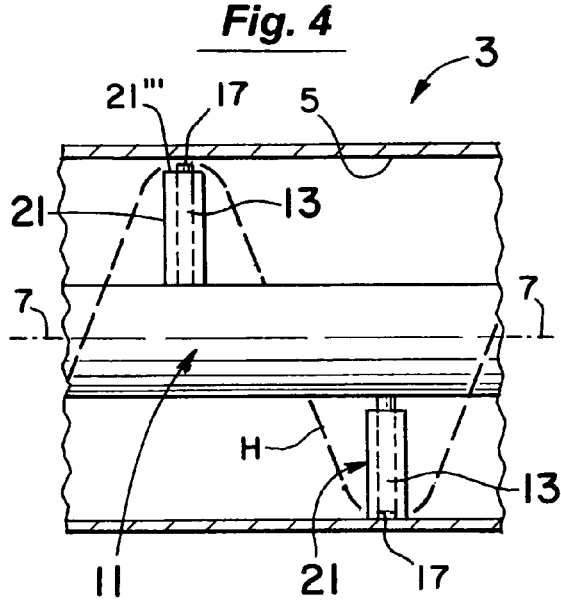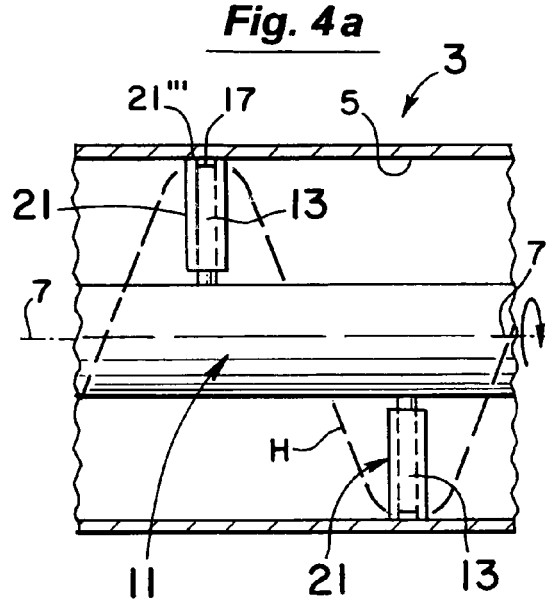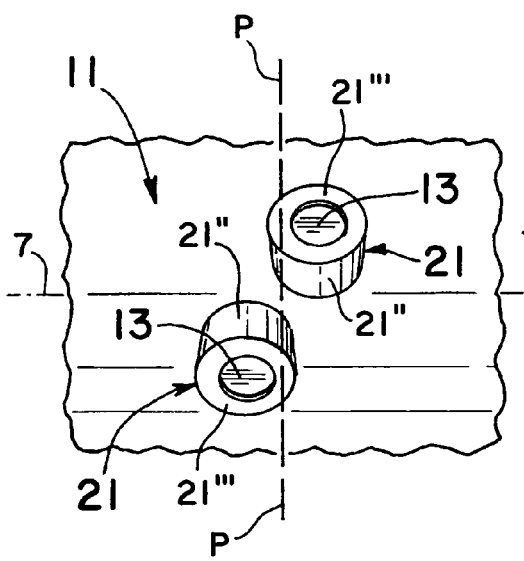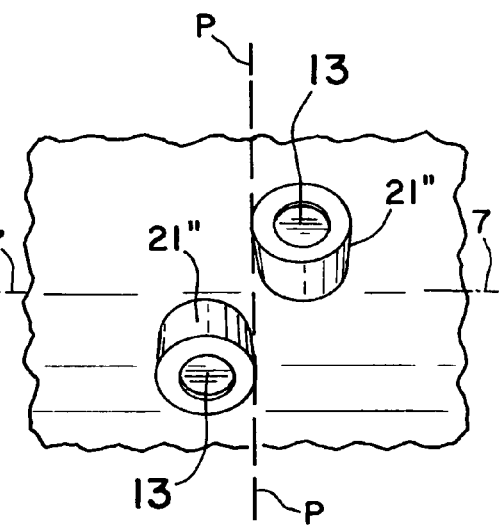

PIN CONVEYOR FOR PASTY MATERIALS SUCH AS ANIMAL WASTE

BACKGROUND OF THE INVENTION

1. Field of the Invention

This invention relates to the field of conveyors and more particularly to the field of pin conveyors with scrapers to contact and clean the inner surfaces of the housing enclosing the conveyed material.

2. Discussion of the Background

Pin conveyors commonly have a plurality of pins mounted in a helical pattern along and about a driven shaft. Frequent applications of such conveyors are to mix, agglomerate, pelletize, agitate, blend and stir particulate/particulate solids or liquid/particulate solids. In operation, the helical pattern of the conveyor serves to advance the material through the housing enclosing it. Such conveyors additionally have desirable application in the handling of thick, sticky, pasty materials such as animal waste which can overpower more conventional screw conveyors having solid blades. As compared to solid blades, the pins can shear through the pasty material while at the same time provide a forwardly directed force due to their helical pattern about the driven shaft.

In handling pasty materials such as animal waste and in particular poultry waste, heat is often added to the material as it is being conveyed through the housing to dry it. However, heating the waste material can aggravate the already existing problem that the material tends to stick or adhere to heated surfaces of the housing. This is particularly the case if the surfaces enclosing the material are metallic. In such applications, any material sticking to the metallic surfaces not only inhibits the efficient transfer of the heat into the material but also impedes the overall conveyance of the material through the housing. Other heating techniques such as applying heated air to the material will also aggravate the sticking problem. Regardless of how or even whether the conveyed pasty material is additionally heated or dried, the sticking problem of the material to the inner surfaces of the conveyor housing must be addressed. Otherwise, the efficient operation of the overall system can be adversely affected.

With this and other problems in mind, the present invention was developed. In it, sleeve members are slidably mounted about the pins of the conveyor and are centrifugally impelled or thrown outwardly to contact and scrape the inner surfaces of the housing. The inner surfaces are then kept cleaner for the more efficient conveyance of the material through the housing as well as the more effective heat transfer to the material as it is being conveyed.

SUMMARY OF THE INVENTION

This invention involves a pin conveyor for pasty materials such as animal waste. The conveyor includes a housing with a cylindrical inner surface extending along and about an axis. The conveyor further includes a shaft mounted within the housing surface for rotation about the axis. The shaft has a plurality of pins attached to it in a substantially helical pattern with the pins having sleeve members slidably mounted about them. In operation, the sleeve members are centrifugally impelled or thrown outwardly of the pins to contact and scrape clean the cylindrical housing surface as the shaft is rotated about the axis.

In some embodiments, the cylindrical outer surfaces of the sleeve members overlap or are at least tangent to one another when viewed in a plane perpendicular to the rotational axis. In operation, the end surfaces of the outwardly impelled sleeve members then contact overlapping or at least abutting areas of the surrounding housing surface. Effectively, the entire housing surface surrounding the sleeve members along the rotational axis is thereby scraped and cleaned. In the preferred embodiments, the material being conveyed is also heated to help dry it out.

BRIEF DESCRIPTION OF THE DRAWINGS

FIG. 4 illustrates the positions of the pins and sleeve members of the present invention when the conveyor is stopped and the shaft is not rotating.

FIG. 4a is a view similar to FIG. 4 but showing the positions of the pins and sleeve members when the conveyor is operating and the driven shaft is rotated to impel the sleeve members outwardly against the housing surface.

FIG. 5 is an enlarged view of adjacent pins and sleeve members illustrating how the cylindrical outer surfaces of the sleeve members preferably overlap when viewed along the common plane P.

FIG. 5a is a view similar to FIG. 5 but showing the cylindrical outer surfaces of adjacent sleeve members positioned to be tangent to the common plane P.

DETAILED DESCRIPTION OF THE INVENTION

Figure 1:
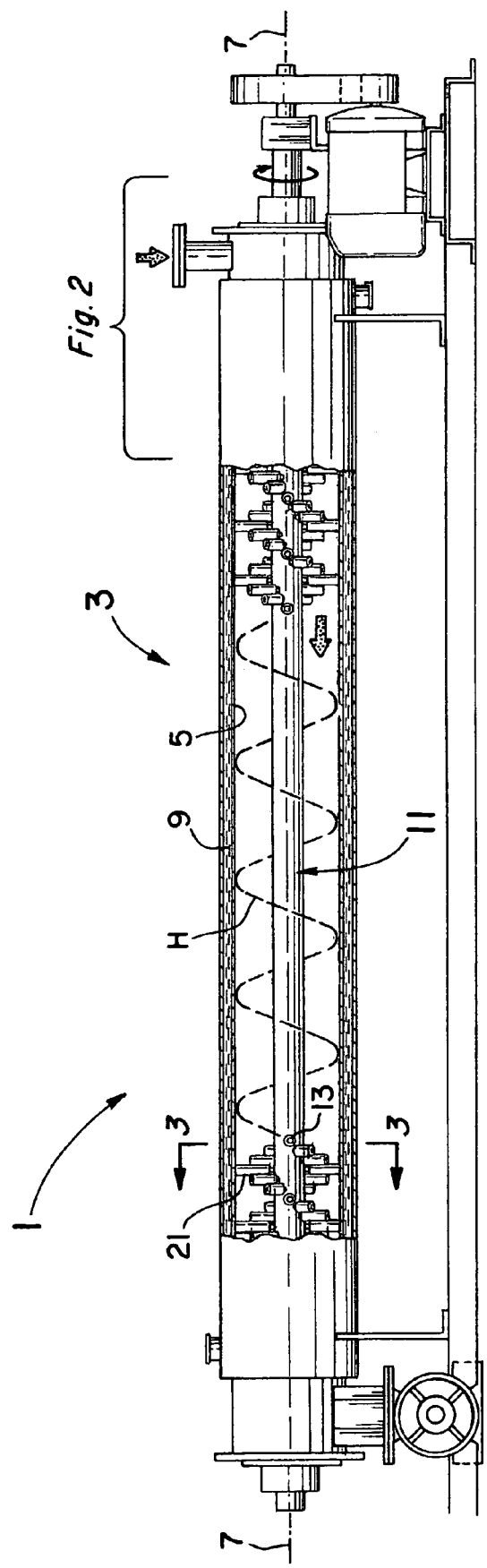
FIG. 1 is a partially cutaway view of the interior and exterior of the pin conveyor of the present invention.
Figure 2:
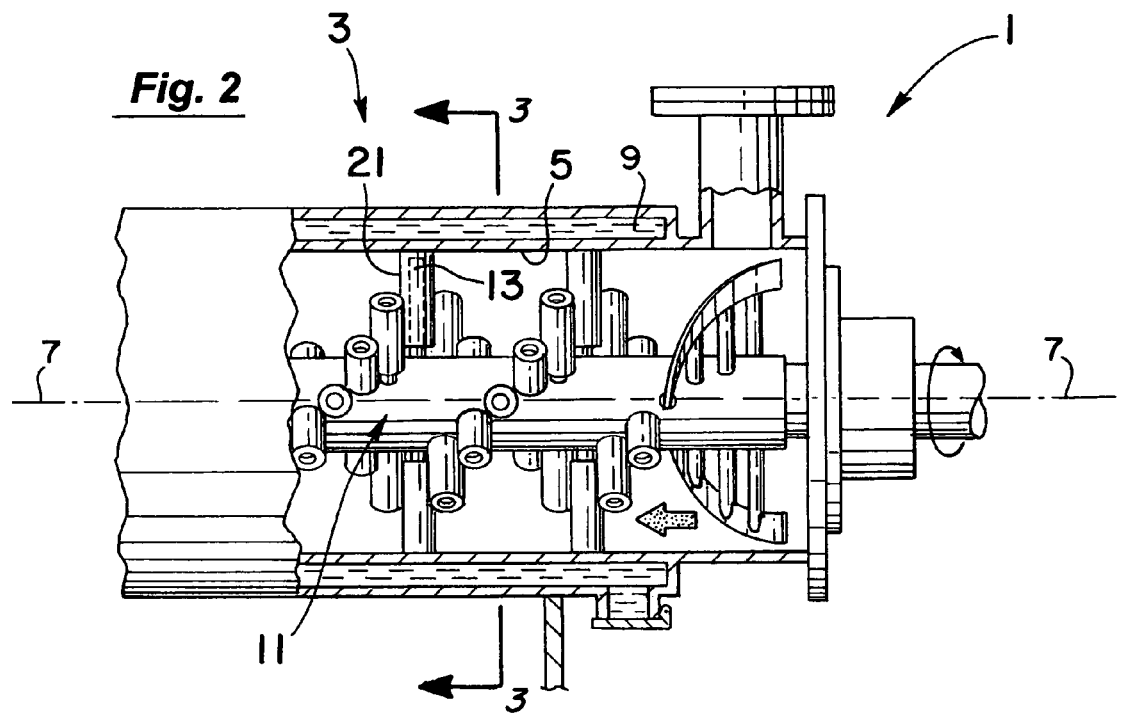
FIG. 2 is an enlarged and partially cutaway view of the inlet area of the pin conveyor.

As best seen in FIGS. 1 and 2, the pin conveyor 1 of the present invention includes a housing 3 with a substantially cylindrical inner surface 5. The cylindrical inner surface 5 extends along and about the substantially horizontal axis 7 and is preferably made of heat conducting material (e.g., metal). In this manner, the surface 5 (see also FIG. 3) can be heated by a surrounding channel of hot oil 9 or other heated liquid, steam, or gas to aid in drying out the material being conveyed. The metallic surface 5 could also be externally heated above the ambient temperature in other manners including electrically if desired.

Within the cylindrical inner surface 5 of the housing 3, the shaft 11 (FIGS. 1 and 2) of the pin conveyor 1 is mounted for rotation about the axis 7. The shaft 11 extends along and about the axis 7 and has a plurality of pins 13 mounted to it as perhaps best seen in FIGS. 3, 4, and 4a. Opposing pins 13 can be formed in a number of manners including from a common bar 15 (FIG. 3) extending through the shaft 11. Regardless of how the pins 13 are attached to the shaft 11, each pin 13 (FIGS. 3 and 4) preferably has a tip 17 spaced (e.g., 0.015 to 0.25 inches or more) from the cylindrical inner surface 5 of the housing 3. The cylindrical surface 5 in this example may be on the order of 12 inches in diameter with the bars 15 in FIG. 3 being slightly less (e.g., 11.97 to 11.50 inches) in diameter. As illustrated, each pin 13 preferably has a sleeve member 21 slidably mounted about it. In operation when the shaft 11 is rotated about the axis 7 (FIG. 4a), the sleeve members 21 are centrifugally impelled or thrown outwardly of the pins 13 to contact and scrape (FIG. 3) the cylindrical inner surface 5 of the housing 3.

Figure 3:
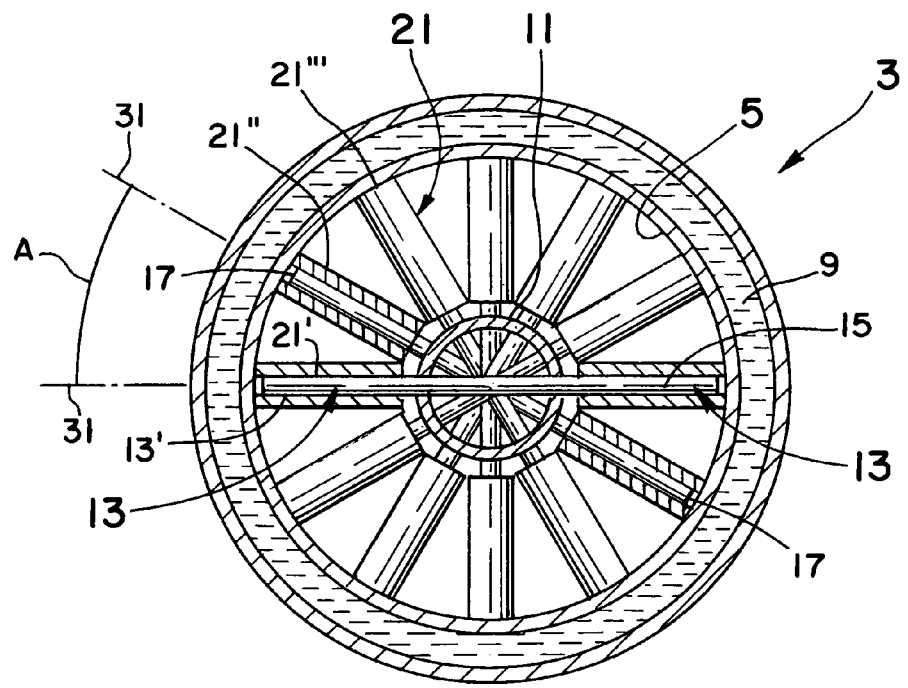
FIG. 3 is a view taken along line 3—3 of FIG. 1 and line 3—3 of FIG. 2.

The pins 13 as shown are preferably spaced from each other along and about the axis 7 in at least one substantially helical pattern H. Adjacent pins 13 can for example be radially spaced from each other at angle A in FIG. 3 between about 20 to 40 degrees (e.g., 30 degrees). The sleeve members 21 could have a number of shapes but are preferably cylindrical with cylindrical inner and outer surfaces 21' and 21" (FIG. 3). Each inner cylindrical surface 21' is then positioned concentrically about and adjacent (e.g., 0.015 to 0.25 inches) the outer cylindrical surface 13' of the pin 13. In use, the rigid pins 13 with the sleeve members 21 mounted thereabout can shear through pasty materials such as poultry waste and other thick, sticky materials being conveyed through the housing 3. At the same time, their overall helical pattern H provides a forwardly directed force (i.e., from right to left in FIGS. 1 and 2).

In operation, the cylindrical outer surfaces 21" of adjacent, radially spaced sleeve members 21 (see FIG. 5) preferably overlap as viewed along the common plane P. As illustrated in FIG. 5, the overlapping portions of the sleeve members 21 intersect the common plane P which extends substantially perpendicular to the axis 7 of the shaft 11. The substantially annular end surfaces 21''' (FIG. 5) of the adjacent sleeve members 21 then respectively contact and scrape overlapping areas of the cylindrical inner surface 5 of the housing 3 along the axis 7. At a minimum, the cylindrical outer surfaces 21" of adjacent sleeve members 21 (see FIG. 5a) are preferably at least tangent to the common plane P. The end surfaces 21''' will then contact and scrape clean abutting areas of the cylindrical inner surface 5 of the housing 3 along the axis 7.

In either embodiment of FIG. 5 or 5a, effectively all of the cylindrical inner surface 5 of the housing 3 along the axis 7 is contracted and scraped by the sleeve members 21. In this last regard, the sleeve members 21 are preferably made of a material with a relatively low coefficient of friction including as for example PTFE Teflon® (i.e., polytetrafluoroethylene). In operation, the annular end surface 21''' (FIGS. 3 and 5) of each sleeve member 21 either initially conforms to the shape of the cylindrical inner surface 5 of the housing 3 or wears down to so conform.

As indicated above and as shown in FIG. 3, the rigid pins 13 (e.g., stainless steel) extend outwardly of the shaft 11 along radial axes 31. The sleeve members 21 are preferably concentrically mounted about the pins 13 to slidably move relative thereto along the axes 31. The sleeve members 21 preferably extend along the axes 31 for a distance (e.g., 3.875 inches) less than the distance (e.g., 4.0 inches) the pins 13 extend (see FIG. 4). In operation, the pin tips 17 are then received in the sleeve members 21 as the sleeve members 21 are centrifugally impelled outwardly of the pins 13 (i.e., compare the positions with the shaft 11 not rotating in FIG. 4 to the positions with the shaft 11 rotating (e.g., 350 rpm's) in FIG. 4a). Regardless of whether the sleeve members 21 are shorter or longer than the pins 13, the pin tips 17 are preferably spaced from but nevertheless fairly close to the housing surface 5 (e.g., 0.015 to 0.25 inches). In this manner, the outer surfaces 21''' of the sleeve members 21 tend to ride against the housing surface 5 (e.g., at 2–50 times the force of gravity); and, any torque on the sleeve members 21 tending to pinch or nip them on the pins 13 is kept to a minimum.

The pin conveyor 1 is shown in FIGS. 1–5a with the axis 7 of the housing and shaft 7 substantially horizontal. However, the axis 7 can be inclined to the horizontal (FIG. 6) if desired. In doing so, gravity will then assist the conveyance of the material through the inclined housing 3 (i.e., from left to right in FIG. 6). The axis 7 can also be substantially 90 degrees to the horizontal or vertical as in FIG. 7.

Figure 6:
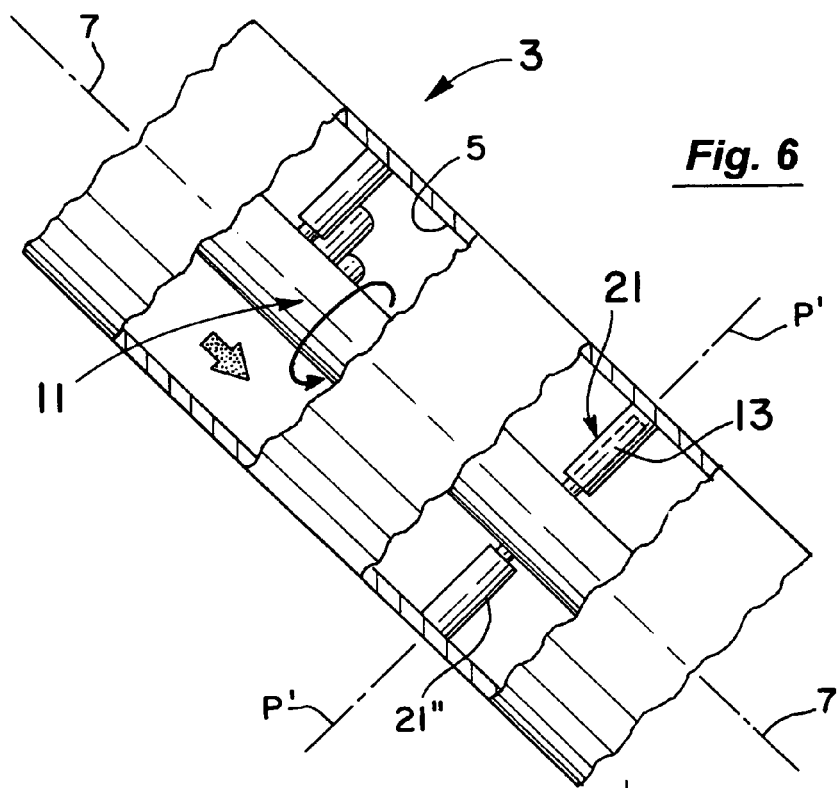
FIG. 6 illustrates the pin conveyor of the present invention with the rotational axis inclined and with pins and sleeve members in helical and non-helical patterns on the shaft.
Figure 7:
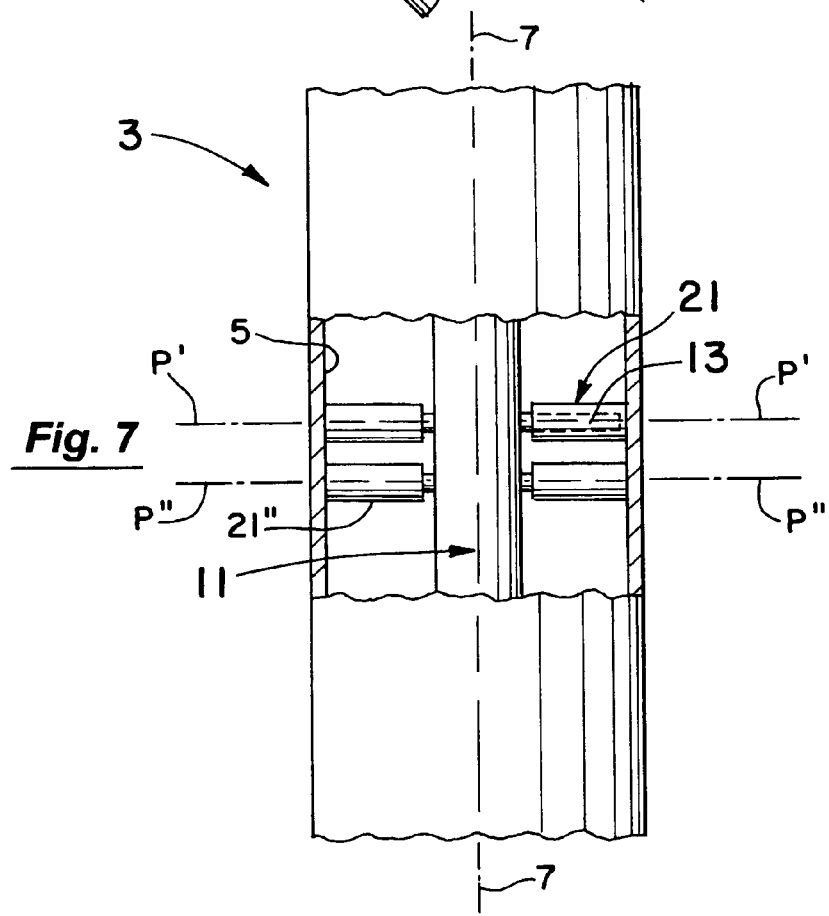
FIG. 7 illustrates pin conveyor with the rotational axis substantially vertical and with two sets of pins and sleeve members respectively positioned in two planes spaced from each other along the rotational axis.

The pins 13 and sleeve members 21 as shown in FIGS. 1–5a are mounted on the shaft 11 in a substantially helical pattern H. However, the pins 13 and sleeves 21 can be mounted in multiple helical patterns or even in non-helical patterns if desired. As for example, the pins 13 and sleeves 21 can be mounted in one or more planar sets (see the planar set at the lower end of FIG. 6 and the two planar sets in FIG. 7). In the configuration of FIG. 6, adjacent pins 13 and sleeve members 21 extend radially in a common plane P' which is substantially perpendicular to the axis 7. In the configuration of FIG. 7, the two sets respectively extend in common planes P',P''' spaced from each other along the axis 7.

The sets of pins 13 and sleeve members 21 in the configurations of FIGS. 6 and 7 may be particularly applicable for mixing or breaking up some kinds of material. The cylindrical outer surfaces 21" of the sleeve members 21 in the sets of FIGS. 6 and 7 could be slightly offset to overlap or be tangent to contact and scrape overlapping or abutting areas of the cylindrical inner surface 5 of the housing 3. Additionally, the pins 13 and sleeve members 21 could be in other non-helical patterns with or without all or some of the cylindrical outer surfaces 21" of adjacent or immediately adjacent sleeve members 21 overlapping or being tangent. Sleeve members 21 within a common plane could also be combined with other sleeve members tangent or overlapping them to contact and scrape substantially all of the cylindrical inner surface 5 of the housing 3 if desired.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A pin conveyor including:
   a housing having a substantially cylindrical inner surface extending along and about a first axis,
   a shaft mounted for rotation within said cylindrical inner surface of said housing, said shaft extending along and about said first axis and having a plurality of pins mounted thereto to extend substantially radially outwardly of said shaft and said first axis, said pins having tips spaced from the cylindrical inner surface of said housing, said pins being spaced from each other along and about said first axis, and
   a plurality of separate, individual sleeve members respectively slidably mounted about at least some of said pins, said sleeve members being centrifugally impelled outwardly of said pins to contact and scrape the cylindrical inner surface of said housing as said shaft is rotated about said first axis.

2. The pin conveyor of claim 1 wherein said pins are spaced from each other to extend along and about said shaft in at least one substantially helical pattern.

3. The pin conveyor of claim 2 wherein adjacent pins are spaced radially about said shaft at about 20 to 40 degrees from each other.

4. The pin conveyor of claim 2 wherein said sleeve members mounted about said pins have inner and outer surfaces and the outer surfaces of at least some adjacent sleeve members radially spaced from each other about said first axis are at least tangent to a common plane extending substantially perpendicular to said first axis wherein substantially all of the cylindrical inner surface of said housing extending about and along said sleeve members is contracted and scraped by said sleeve members centrifugally impelled outwardly of said pins as said shaft is rotated about said first axis.

5. The pin conveyor of claim 2 wherein said sleeve members mounted about said pins have inner and outer surfaces and the outer surfaces of at least some adjacent sleeve members radially spaced from each other about said first axis intersect a common plane extending substantially perpendicular to said first axis wherein said adjacent sleeve members respectively contact and scrape overlapping areas of the cylindrical inner surface of said housing along said first axis as said sleeve members are centrifugally impelled outwardly of said pins as said shaft is rotated about said first axis.

6. The pin conveyor of claim 2 wherein said first axis extends substantially horizontally.

7. The pin conveyor of claim 1 wherein said pins and sleeve members respectively mounted thereabout extend along the respective radial axes for a distance and the distance the respective sleeve members extend therealong is less than the distance the respective pins extend therealong wherein the tips of said pins are received in said respective sleeve members when said sleeve members are centrifugally impelled outwardly of the pins to contact and scrape the cylindrical inner surface of said housing as said shaft is rotated about said first axis.

8. The pin conveyor of claim 1 wherein said sleeve members are concentrically mounted about said pins.

9. The pin conveyor of claim 1 wherein said first axis is inclined to the horizontal.

10. The pin conveyor of claim 9 wherein said first axis is inclined to the horizontal between about 30 to 60 degrees.

11. The pin conveyor of claim 9 wherein said first axis is inclined to the horizontal at about 90 degrees.

12. The pin conveyor of claim 1 wherein said cylindrical inner surface of said housing is made of heat conducting material.

13. The pin conveyor of claim 12 wherein the heat conducting material is metal.

14. The pin conveyor of claim 1 wherein the inner cylindrical surface of said housing is externally heated above the ambient temperature.

15. A pin conveyor including:
a housing having a substantially cylindrical inner surface extending along and about a first axis,
a shaft mounted for rotation within said cylindrical inner surface of said housing, said shaft extending along and about said first axis and having a plurality of pins mounted thereto to extend substantially radially outwardly of said shaft and said first axis, said pins having tips spaced from the cylindrical inner surface of said housing, said pins being spaced from each other along and about said first axis, and
a plurality of sleeve members slidably mounted about at least some of said pins, said sleeve members being centrifugally impelled outwardly of said pins to contact and scrape the cylindrical inner surface of said housing as said shaft is rotated about said first axis wherein at least a first set of pins radially adjacent one another about said first axis extend substantially in a first common plane substantially perpendicular to said first axis.

16. The pin conveyor of claim 15 further including a second set of pins radially adjacent one another about said first axis extending substantially in a second common plane substantially perpendicular to said first axis and spaced from said first common plane.

17. A pin conveyor including:
a housing having a substantially cylindrical inner surface extending along and about a first axis,
a shaft mounted for rotation within said cylindrical inner surface of said housing, said shaft extending along and about said first axis and having a plurality of pins mounted thereto to extend substantially radially outwardly of said shaft and said first axis, said pins having tips spaced from the cylindrical inner surface of said housing, said pins being spaced from each other along and about said first axis, and
a plurality of sleeve members slidably mounted about at least some of said pins, said sleeve members being centrifugally impelled outwardly of said pins to contact and scrape the cylindrical inner surface of said housing as said shaft is rotated about said first axis wherein said pins have substantially cylindrical outer surfaces and said sleeve members have substantially cylindrical inner surfaces, said sleeve members being slidably received about said pins with the respective inner and outer cylindrical surfaces adjacent one another.

18. The pin conveyor of claim 17 wherein said sleeve members are substantially cylindrical with inner and outer substantially cylindrical surfaces.

19. A pin conveyor including:
a housing having a substantially cylindrical inner surface extending along and about a first axis,
a shaft mounted for rotation within said cylindrical inner surface of said housing, said shaft extending along and about said first axis and having a plurality of pins mounted thereto to extend substantially radially outwardly of said shaft and said first axis, said pins having tips spaced from the cylindrical inner surface of said housing, said pins being spaced from each other along and about said first axis, and
a plurality of sleeve members slidably mounted about at least some of said pins, said sleeve members being centrifugally impelled outwardly of said pins to contact and scrape the cylindrical inner surface of said housing as said shaft is rotated about said first axis wherein said sleeve members are made of polytetrafluoroethylene.

20. A pin conveyor including:
a housing having a substantially cylindrical inner surface extending along and about a first axis,
a shaft mounted for rotation within said cylindrical inner surface of said housing, said shaft extending along and about said first axis and having a plurality of pins mounted thereto to extend substantially radially outwardly of said shaft and said first axis, said pins having tips spaced from the cylindrical inner surface of said housing, said pins being spaced from each other along and about said first axis, and
a plurality of sleeve members slidably mounted about at least some of said pins, said sleeve members being centrifugally impelled outwardly of said pins to contact and scrape the cylindrical inner surface of said housing as said shaft is rotated about said first axis wherein said pins are spaced from each other to extend along and about said shaft in at least one substantially helical pattern and wherein radially adjacent sleeve members contact and scrape substantially abutting areas of the cylindrical inner surface of said housing along said first axis as said shaft is rotated about said first axis.

21. A pin conveyor including:

a housing having a substantially cylindrical inner surface extending along and about a first axis, a shaft mounted for rotation within said cylindrical inner surface of said housing, said shaft extending along and about said first axis and having a plurality of pins mounted thereto to extend substantially radially outwardly of said shaft and said first axis, said pins having tips spaced from the cylindrical inner surface of said housing, said pins being spaced from each other along and about said first axis, and a plurality of sleeve members slidably mounted about at least some of said pins, said sleeve members being centrifugally impelled outwardly of said pins to contact and scrape the cylindrical inner surface of said housing as said shaft is rotated about said first axis wherein said pins are spaced from each other to extend along and about said shaft in at least one substantially helical pattern and wherein radially adjacent sleeve members contact and scrape overlapping areas of the cylindrical inner surface of said housing along said first axis as said shaft is rotated about said first axis.

22. A pin conveyor including:

a housing having a substantially cylindrical inner surface extending along and about a first axis, a shaft mounted for rotation within said cylindrical inner surface of said housing, said shaft extending along and about said first axis and having a plurality of pins mounted thereto to extend substantially radially outwardly of said shaft and said first axis, said pins having tips spaced from the cylindrical inner surface of said housing, said pins being spaced from each other along and about said first axis, and a plurality of sleeve members slidably mounted about at least some of said pins, said sleeve members being centrifugally impelled outwardly of said pins to contact and scrape the cylindrical inner surface of said housing as said shaft is rotated about said first axis wherein said pins extend outwardly of said shaft along respective radial axes substantially perpendicular to said first axis and said sleeve members are concentrically mounted about said pins to extend and slide along said respective radial axes relative to said pins.

* * * * *